United States Patent Office 3,496,221
Patented Feb. 17, 1970

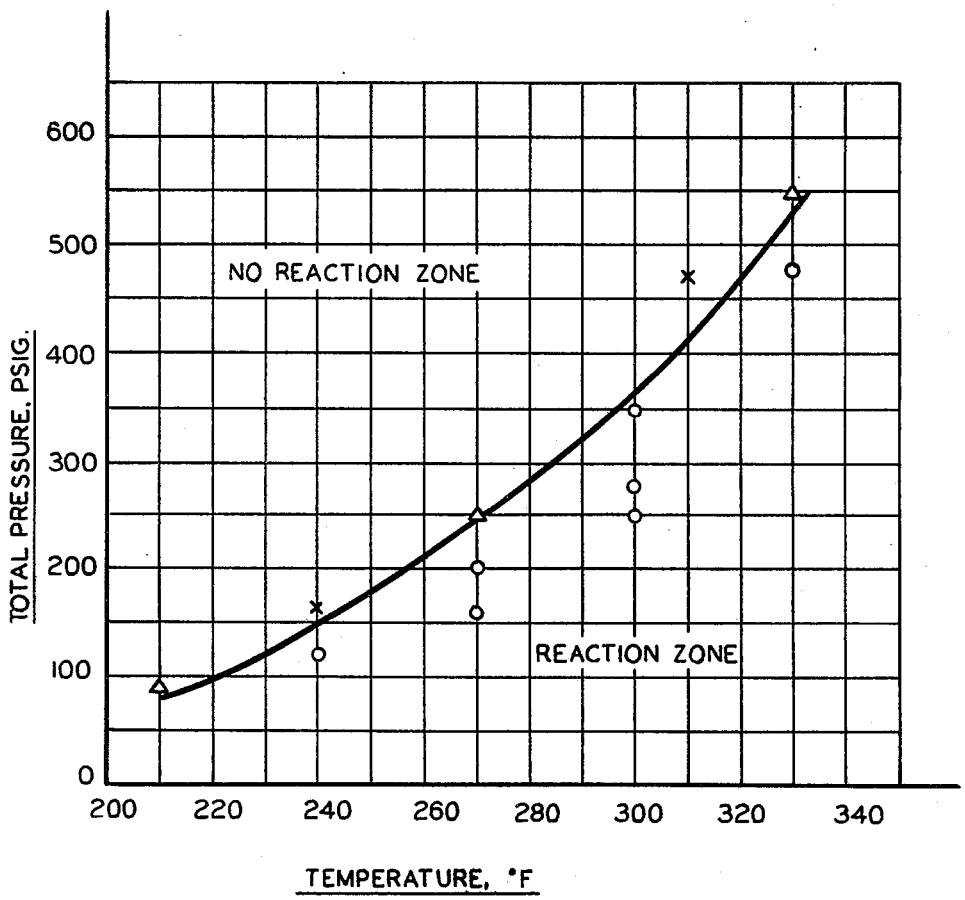

3,496,221
CARBONYLATION OF METHYLACETYLENE TO PRODUCE METHACRYLIC COMPOUNDS
John Happel, Hastings, Joachim H. Blanck, Glen Oaks, and Yasumasa Sakakibara, Bronx, N.Y., assignors to National Lead Company, New York, N.Y., a corporation of New Jersey
Filed Apr. 20, 1967, Ser. No. 632,228
Int. Cl. C07c 67/04, 69/54
U.S. Cl. 260—486                              12 Claims

ABSTRACT OF THE DISCLOSURE

A catalytic process for carbonylation of acetylenic compounds by simultaneously contacting an acetylenic compound, carbon monoxide, and a hydrogen donor in the presence of catalytic amounts of nickel carbonyl and a compound containing an active hydrogen atom to produce acrylates and related compounds, and preferably carrying out the reaction in a continuous manner there being maintained appreciable amounts of carbon monoxide in the reaction mixture at all times.

---

This invention relates generally to a catalytic process for the carbonylation of acetylenic compounds using carbon monoxide with a metal carbonyl specifically nickel carbonyl being used in catalytic amounts, the reaction being carried out at elevated temperatures above about 210° F., and pressures above about 95 p.s.i.g., to produce acrylates and related compounds.

It has been found possible to produce acrylates from acetylenic compounds, i.e. compounds containing at least one triple bond, by catalytic reaction using carbon monoxide in the presence of a compound capable of functioning as a hydrogen donor such as for example, water or an alcohol, and a compound having an active hydrogen atom, for example, an acid. The catalytic material is a metal carbonyl preferably nickel carbonyl. The conditions of temperature and pressure have been found to be interrelated with critical lower limits. It is most desirable to carry out the reaction in a continuous manner. The temperature and pressure are interrelated and are, accordingly so selected; the interrelation employed being that represented by accompanying FIGURES 1 and 2 hereof.

It is an object of this invention to prepare acrylates by catalytic carbonylation reaction.

Another object of this invention is to provide a process for catalytic carbonylation of methyl acetylene.

It is another object to provide a process for the preparation of methacrylic acid esters from methyl acetylene utilizing catalytic reaction with carbon monoxide.

Another object of the invention is to provide a continuous process for carbonylation of methyl acetylene, catalytic reactions resulting in the production of methacrylate esters and other valuable carbonylation products.

These and other objects and advantages of the invention will be apparent from the following detailed description thereof.

Broadly, the process of the invention consists in contacting an acetylenic compound, with an active hydrogen compound, preferably an acid, carbon monoxide, nickel carbonyl, and a hydrogen donor compound, preferably an alcohol, to form carbonylation products by catalytic carbonylation; the reaction being carried out at elevated temperatures and pressures.

The acetylenic compound may be any organic compound containing at least ont triple bond and having no group present which will interfere with the carbonylation reaction. It is preferred to use the acetylenic hydrocarbons having more than 2 carbon atoms per molecule and equivalent compounds. Methyl acetylene is especially useful for the process of the invention as it gives high levels of reactivity and produces via the carbonylation valuable methacrylates, and other carbonylation products, and further has been found useful for continuous operation of the invention process.

The active hydrogen compound may be an acid produced in the reaction, i.e. methacrylic acid or acrylic acid or the acid utilized can be hydrogen halide such as hydrogen chloride, hydrogen bromide or hydrogen iodide, the first mentioned being preferred. Organic acids such as acetic acid, propionic acid, formic acid, crotonic acid and the like, can be utilized.

The acid employed must not unduly interfere with the catalytic carbonylation. Some care must also be exercised in selecting the acid in order to avoid side reactions and formation of by-products which are difficult to separate.

The selection of the particular hydrogen donor compound is indicated somewhat by the acrylate desired as product. Water can be used and yields an acid, not an ester. The alkanol employed can be a monohydric aliphatic alcohol having from 1 to 8 carbon atoms, e.g., methanol, ethanol, n-propanol, i-propanol, n-butanol, i-butanol, amyl alcohol, i-octyl alcohol, etc. The use of methanol or ethanol is particularly preferred in the process since they result in the products methyl methacrylate and ethyl methacrylate, respectively, with methylacetylene. It is also possible to employ thioalcohols, amines, polyhydric alcohols, aminoalcohols and amides as the hydrogen donor compounds.

It is possible, under some circumstances to use the same compound, either mono- or polyfunctional, as both the active hydrogen compound and the hydrogen donor compound in the carbonylation reaction.

The catalytic carbonylation reaction is carried out in the liquid phase and it is convenient and in most instances desirable, to use the compound which functions as the hydrogen donor compound as the diluent. Thus, in preferred embodiment, the reaction will be carried out in methanol or ethanol as the diluent in the reaction vessel.

It is important, and has in fact been found critical, to carry out this catalytic carbonylation at superatmospheric pressures, above about 95 p.s.i.g. The upper pressure is limited by the safety factors of carrying out the reaction and it has been operated at pressures as high as 1200 p.s.i.g.

The reaction proceeds at elevated temperatures, a temperature of at least 210° F. and preferably higher being desirable for rapid reaction rate. The upper temperature limit is likewise limited by safety measures but otherwise can be as high as desired, provided the reaction is conducted in liquid phase. Temperatures of 250–380° F. are preferred when methacrylates are produced.

The carbonylation reaction is catalyzed by the presence of relatively small catalytic amounts of nickel carbonyl. For example, it has been found possible to employ amounts of 0.05% by weight of nickel carbonyl based on the weight of total mixture in which the carbonylation reaction is taking place. However, in order to facilitate smooth, continuous carbonylation of methyl acetylene, it is desirable to carry out the carbonylation in the presence of somewhat higher levels of nickel carbonyl. Excessive amounts of nickel carbonyl are uneconomical, and unnecessary.

The process is carried out by continuously or semi-continuously feeding to a pressure reactor, one or more reactant streams containing methyl acetylene, carbon monoxide, methanol, nickel carbonyl, and an acid (methacrylic acid). The catalytic carbonylation is preferably carried out at a temperature of about 250–380° F. and a pressure of from 95 p.s.i.g. up to about 1000 p.s.i.g. The carbonylation products are continuously removed. As desired, unreacted materials are recycled. The processes utilized to separate the carbonylation products are well known in the art. The products which result in high yields include the methyl and ethyl methacrylate esters and such products as may correspond to the respective starting materials.

These unsaturated ester products are well known in the art as starting materials for preparing polymers, films, coatings, and the like in any instance where unsaturated esters are used.

It is desirable although not necessary to employ an inhibitor or stabilizer such as hydroquinone in small amounts in the reaction system.

In carrying out this catalytic reaction, according to the invention, carbon monoxide enters the reaction zone from only one source, via free carbon monoxide. It is important that the carbon monoxide be consumed from the source of the chemical itself and not from any of the nickel carbonyl which is supplied to the reaction solely for its function as catalyst. It has been found necessary to have a substantial amount of carbon monoxide present, whenever methyl acetylene and nickel carbonyl and the hydrogen donor substance may be present together in the reaction system. By operating according to the conditions set forth above, the direct reaction of nickel carbonyl is avoided. Further avoidance of direct reaction of nickel carbonyl precludes the production of any hydrogen as a by-product which causes undesirable hydrogenation of the carbonylation products, for example, methyl methacrylate would be hydrogenated to the saturated methyl isobutyrate which is difficult to separate and yields inferior products. Polymer formation is substantially eliminated by the practice of the invention process.

In carrying out the carbonylation, it has been found entirely satisfactory to use impure methyl acetylene, a purity of about 50% being useful provided there are no impurities present which interfere with the carbonylation reaction.

The invention is described herein in preferred embodiments, but it is to be understood that the invention is in no way confined to the particular forms, uses or sizes shown and described, the same being merely illustrative, and that the invention may be made and carried out in other ways without departure from the spirit of the invention, and therefore there is claimed the right to employ all equivalents coming within the scope of the appended claims and by means of which the objects of the invention are obtained and new results and advantages accomplished.

In the following examples it is to be understood that all parts are given by weight unless otherwise indicated.

Example 1(A)

As an example of carrying out the catalytic preparation of methyl methacrylate by continuous process, a one-gallon stirred autoclave was charged with 553 gm. of a solution containing:

| | Gm. |
|---|---|
| Methanol | 469 |
| Methacrylic acid | 60 |
| Nickel carbonyl | 23 |
| Hydroquinone (as inhibitor) | 1 |

An initial pressure of 190 p.s.i.g. of carbon monoxide was applied to the charged autoclave. The reactor was then heated to 330° F. at which point the pressure was 550 p.s.i.g. The autoclave was then connected to a carbon monoxide reservoir through a pressure regulating valve set at this pressure. Two separate liquid feed streams were then started and maintained at a constant rate. The first feed stream contained:

| | Percent |
|---|---|
| Nickel carbonyl | 11.8 |
| Methanol | 78.1 |
| Methacrylic acid | 10.0 |
| Hydroquinone | 0.1 |

A total of 660 grams of this stream was fed over a period of 4 hours and 2 minutes. The second feed solution contained:

| | Percent |
|---|---|
| Methyl acetylene | 29.0 |
| Inert hydrocarbons | 2.7 |
| Methanol | 60.4 |
| Methacrylic acid | 7.8 |
| Hydroquinone | 0.1 |

A total of 2154 grams of this solution was fed over a period of 4 hours and 42 minutes.

About one hour after the feed solutions were started, a product stream was withdrawn from the reactor at a constant rate for about 4 hours. The amount collected was 2217 gms., with 1523 gms. remaining in the reactor. A total of 397 gms. of carbon monoxide was consumed.

Analysis of this product showed that 1587 gms. of methyl methacrylate plus methyl crotonate were formed. The yield based on methyl acetylene used was 99.2%. This figure does not include any methyl methacrylate formed by the esterification of methacrylic acid.

Example 1(B)

As an example of carrying out the catalytic preparation of methyl methacrylate by a semi-continuous process, a one-gallon stirred autoclave was charged with 570 gms. of a solution containing:

| | Gm. |
|---|---|
| Methanol | 478 |
| Methacrylic acid | 61 |
| Nickel carbonyl | 30 |
| Hydroquinone | 1 |

An initial pressure of 130 p.s.i.g. of carbon monoxide was applied. The reactor was then heated to 330° F. at which point the reactor pressure reached 500 p.s.i.g. The autoclave was then connected to a carbon monoxide reservoir to maintain this pressure. There was then fed 658 gms. of a solution containing:

| | Gm. |
|---|---|
| Methanol | 438 |
| Methyl acetylene | 201 |
| Inert hydrocarbons | 19 |

This solution was fed at a constant rate for a period of about 2 hours. Total carbon monoxide consumed was 134 gm.

Analysis of the product showed that 460 gm. of methyl methacrylate and 61 gm. of methyl crotonate, its isomer, were produced. Subtracting from that, the amount of methacrylic acid which was esterified, the yield was 98.7%, based on the methyl acetylene used.

In both the above described Examples 1(A) and 1(B) methacrylic acid were employed as the substance furnishing the active hydrogen atom.

Example 2

The stirred autoclave was charged with 595 gms. of solution consisting of:

| | Gm. |
|---|---|
| Methanol | 480 |
| Nickel carbonyl | 30 |
| Water | 24 |
| Methacrylic acid | 60 |
| Hydroquinone | 1 |

Carbon monoxide was then introduced until the pressure in the system reached 50 p.s.i.g. The autoclave was heated to 275° F. at which point the pressure was 200 p.s.i.g. The system was then connected to a carbon monoxide reservoir to maintain this pressure.

Then 370 gms. of a methanol-methyl acetylene mixture, containing 111 gms. of methyl acetylene, was fed over a period of about 2½ hours. The amount of carbon monoxide reacted was 63.8 gms.

The product recovered was 963 gms., of which 231 gms. was methyl methacrylate and 21.1 gms., was methyl crotonate. Based on the methylacetylene used, the yield was 83–85.

Example 3

The stirred autoclave was charged with the following materials:

| | Gm. |
|---|---|
| Ethanol | 600 |
| Methacrylic acid | 60 |
| Nickel carbonyl | 30 |
| Hydroquinone | 1 |

Carbon monoxide was then introduced until the total pressure became 50 p.s.i.g. The autoclave was then heated to 270° F. at which point the pressure was 200 p.s.i.g. The system was then connected to a carbon monoxide reservoir to maintain this pressure.

Then 688 gms. of a second solution was fed at a constant rate over a period of about 3 hours. Its composition was as follows:

| | Wt. percent |
|---|---|
| Ethanol | 68 |
| Methyl acetylene | 32 |

During this time 125 gms. of carbon monoxide was consumed and 1328 gms. of product was produced Analysis showed that the yield to ethyl methacrylate and ethyl crotonate was 86%.

Example 4

The stirred autoclave was charged with 559 gms. of a solution containing the following:

| | Gm. |
|---|---|
| Methanol | 468 |
| Methacrylic acid | 60 |
| Nickel carbonyl | 30 |
| Hydroquinone | 1 |

Carbon monoxide was introduced until the total pressure became 20 p.s.i.g. The autoclave was then heated to 270° F., at which point the pressure was 170 p.s.i.g. The system was then connected to a carbon monoxide reservoir to maintain this pressure. Then 2,361 gms. of a solution containing:

| | Gm. |
|---|---|
| Methanol | 1730 |
| Methyl acetylene | 540 |
| Methacrylate acid | 60 |
| Nickel carbonyl | 30 |
| Hydroquinone | 1 | was fed at a constant rate over a period of 5 hours and 20 minutes. Product was continuously withdrawn at a constant rate over a 5 hour period. A total of 2,429 gms. was collected.

This product stream was analyzed at regular intervals. Inasmuch as the concentration of nickel carbonyl in the charging solution was greater than in the feed the nickel carbonyl concentration in the reacting mixture continued to decrease. The concentration decreased to the point below which it no longer catalyzed the reaction. These data are shown in the following Table I.

TABLE I

| Reaction time, hours | Nickel carbonyl, concentration, wt. percent | State of reaction |
|---|---|---|
| 2.5 | 0.8 | Proceeding. |
| 3.5 | 0.4 | Do. |
| 4.5 | 0.1 | Do. |
| 5.3 | Trace | Terminated. |

These data indicate that at a weight percent nickel carbonyl concentration of 0.1, the reaction was sustained but at trace concentrations the reaction spontaneously stopped.

The termination of the reaction was evidenced by the fact that carbon monoxide was no longer being consumed.

Example 5

This example shows runs in which varying concentrations of nickel carbonyl were employed in continuous experiments.

The stirred autoclave was charged as follows, in each of the three runs shown in Table II below:

TABLE II

| Run No | 5 (A) | 5 (B) | 5 (C) |
|---|---|---|---|
| Methanol, gms | 468 | 469 | 500 |
| Methacrylic acid, gms | 60 | 60 | 29 |
| Nickel carbonyl, gms | 30 | 23 | 23 |
| Hydroquinone, gms | 1 | 1 | 1 |

The temperature and pressure were controlled as described in the foregoing examples. A temperature of 270° F. and pressure of 190 p.s.i.g. was used for all runs except for Run 5(A) where the pressure was 170 p.s.i.g.

For each of the three runs, the feed material was as shown in Table III below:

TABLE III

| Run No | 5 (A) | 5 (B) | 5 (C) |
|---|---|---|---|
| Methanol, wt. percent | 73.3 | 66.3 | 72.6 |
| Methyl acetylene, wt. percent | 22.9 | 21.0 | 20.9 |
| Nickel carbonyl, wt. percent | 2.5 | 8.5 | 4.2 |
| Hydroquinone, wt. percent | 0.03 | 0.09 | 0.09 |

A total of 2,361 gms. were fed for Run 5(A) 2,748 for Run 5(B) 2,949 gms. were fed for Run 5(C). The reactions proceeded smoothly except for Run 5(A) where after 5¼ hours the reaction spontaneously terminated. At this point the nickel carbonyl concentration in the reacting mixture was less than 0.1% by weight. For Runs 5(B) and 5(C), the concentration was 3.9% and 2.2% respectively. In these runs the reactions continued to proceed smoothly to their intended termination.

Example 6

Using methacrylic acid as the active hydrogen substance, the lower temperature and pressure limits are in the range of 210° F. and 95 p.s.i.g.

Illustrating the use of methacrylic acid, the stirred autoclave was charged with 473 gms. of a solution containing 320 gms. of methanol and 152 gms. of methyl acetylene. A pressure of 20 p.s.i.g. of carbon monoxide was imposed therein and the autoclave heated to about 250° F. at which point the pressure was 130 p.s.i.g.

The autoclave was connected to the carbon monoxide reservoir as before and 549 gm. of a methanol solution of the following composition was charged at a constant rate over a period of 4½ hours:

| | Wt. percent |
|---|---|
| Methanol | 83.8 |
| Nickel carbonyl | 5.4 |
| Methacrylic acid | 10.7 |
| Hydroquinone | 0.1 |

The reaction proceeded smoothly as noted by the fact that carbon monoxide was being continually consumed. After 2⅓ hours the reaction temperature and pressure were reduced to 210° F. and 95 p.s.i.g., respectively. The reaction continued in progress as noted by carbon monoxide consumption.

At the end of the process, the autoclave contents were analyzed and a total of 384 gms. of methyl methacrylate and methyl crotonate were found.

Example 7

For our process where nickel carbonyl catalyzes the reaction of a hydrogen donor (such as methanol), an acetylenic compound (such as methyl acetylene) and carbon monoxide, pressure and temperature are not independent in determining whether the reaction will occur. If one of these variables is selected then the range of the other is fixed to effect operation. FIGURE 1 illustrates this interrelationship.

As an example, if a reaction temperature of 270° F. is chosen, then the reaction will only occur if the pressure is kept below 250 p.s.i.g. The lower pressure limit is such that the autoclave contents remain in a liquid phase. Examples are described herein above in which the reactions were conducted at 270° F. and below 250 p.s.i.g. An example of conditions where the reaction did not occur is set forth immediately herein below.

The autoclave was charged with 570 gms. of a solution of the following composition (all percentages are by weight):

| | Percent |
|---|---|
| Methanol | 83.8 |
| Methacrylic acid | 10.8 |
| Nickel carbonyl | 5.3 |
| Hydroquinone | 0.1 |

A source of carbon monoxide was then connected and the system pressure was brought to 50 pounds per square inch gauge (p.s.i.g.). The autoclave was then heated to 240° F., during which time the pressure rose to slightly about 150 pounds per square inch gauge.

The system was connected to the carbon monoxide reservoir to maintain this pressure. A solution of methanol and methylacetylene was then fed to the autoclave. Its composition was methanol 67.3 wt. percent and methylacetylene 32.7%.

Over a period of 35 minutes, 177 gms. of this solution was fed at a constant rate. Under these conditions carbon monoxide did not react as evidenced by the fact that none was being consumed.

Example 8

It is known that in the presence of a hydrogen donor compound, a hydrogen active substance and an acetylenic compound nickel carbonyl reacts to form a carbonylation product with the subsequent destruction of nickel carbonyl. It has now been found that in accordance with this invention, using methacrylic acid as the hydrogen active compound, the reaction wherein nickel carbonyl is destroyed, is suppressed and nickel carbonyl is recovered.

Accordingly, it is a preferred embodiment of this process that nickel carbonyl not be in contact with the acetylenic compound, together with a active hydrogen substance and a hydrogen donor in the absence of substantial amounts of carbon monoxide for even short periods of time. Thus, in an arrangement in which these substances are fed to an autoclave through a common line, in the absence of carbon monoxide, with carbon monoxide being fed into the reaction zone through a separate line, a relatively large amount of nickel carbonyl is destroyed as compared with consumption of nickel carbonyl in a process in which nickel carbonyl is fed separately from the acetylenic compound.

As examples of the above differences, the following examples are presented. In one Example 8(A) a combined feed stream was used and in the other 8(B) nickel carbonyl and methyl acetylene were fed separately. Both experiments were conducted at about 330° F. temperature and 480 p.s.i.g. pressure. The autoclave was charged with the same solution in both cases. Its composition was as follows:

| | Gms. |
|---|---|
| Methanol | 469 |
| Nickel carbonyl | 23 |
| Methacrylic acid | 60 |
| Hydroquinone | 1 |

In Example 8(A) a combined feed was used, whose composition was as follows:

| | Wt. percent |
|---|---|
| Methacrylic acid | 8.4 |
| Methanol | 65.7 |
| Methyl acetylene | 21.6 |
| Nickel carbonyl | 4.2 |
| Hydroquinone | 0.1 |

A total of 2,781 gms. of this mixture were fed over a period of 4.8 hours.

In Example 8(B) two feed solutions were employed. The first solution contained the following:

| | Wt. percent |
|---|---|
| Methanol | 60.7 |
| Methyl acetylene | 31.4 |
| Methacrylic acid | 7.8 |
| Hydroquinone | 0.1 |

The second feed solution contained:

| | Wt. percent |
|---|---|
| Methanol | 76.5 |
| Nickel carbonyl | 13.6 |
| Methacrylic acid | 9.8 |
| Hydroquinone | 0.1 |

Of the first solution, 1,758 gms. were fed over a period of 3.7 hours and 717 gms. were fed of the second solution over the same period.

Analysis of the products from each run showed that in the first case Example 8(A) 25% of the nickel carbonyl fed was recovered, while in the second case Example 8(B) 90% of the nickel carbonyl fed was recovered.

In continuous operations, it is convenient to recycle carbon monoxide, nickel carbonyl and hydrogen donor compound which are recovered.

Example 9

The purity of the methyl acetylene used is not critical. The two runs summarized below demonstrate this point. In Run 9(A) the purity was lower than in Run 9(B). The analyses are as follows:

| Run No. | 9 (A) | 9 (B) |
|---|---|---|
| Methyl Acetylene, wt. percent | 91.2 | 98.5 |
| n-Butane | 7.3 | 0.3 |
| Allene | 1.2 | 0.8 |
| Isobutane | 0.3 | 0.3 |

In each instance, the reactor was charged with 533 gms. of a solution containing:

| | Wt. percent |
|---|---|
| Methanol | 84.8 |
| Methacrylic acid | 10.9 |
| Nickel carbonyl | 4.2 |
| Hydroquinone | 0.1 |

The reactor was pressurized to 80 p.s.i.g. with carbon monoxide and the temperature increased to 300° F. at which point the pressure was about 350 p.s.i.g. for both examples. The system was then connected to the carbon monoxide reservoir to maintain this pressure. Subsequently, solutions of the following compositions were fed at a constant rate in each run, the methyl acetylene purity being that given above in each run.

| Run No. | 9 (A) | 9 (B) |
|---|---|---|
| Methanol, wt. percent | 65.6 | 68.0 |
| Methyl acetylene | 21.7 | 18.8 |
| Methacrylic acid | 8.4 | 8.7 |
| Nickel carbonyl | 4.2 | 4.4 |
| Hydroquinone | 0.1 | 0.1 |

For Example 9(A) 2,640 gms. were fed and for 9(B) 2,497 gms. were used.

Analyses of the products obtained showed that the yield to methyl methacrylate and methyl crotonate, based on pure methyl acetylene fed 92.9 for Example 9(A) and 93.6 for Example 9(B).

The hydrocarbon gases present as impurities in the methyl acetylene, such as n-butane, do not react but appear in the off-gas of the process therefore functioning as an inert.

What is claimed is:

1. A continuously catalytic process for carbonylation of methyl acetylene which comprises the steps of contacting methyl acetylene, carbon monoxide and a compound containing a hydrogen donor group, and selected from the group consisting of methanol, ethanol, and water in the presence of nickel carbonyl in catalytic amounts of 0.1% and over and an acidic compound containing an active hydrogen atom, in a liquid phase reaction mixture at a temperature above 210° F. and pressure of above 95 p.s.i.g., the temperature and pressure being interrelated and being selected such that the catalytic carbonylation reaction proceeds at an optimum rate.

2. The catalytic process for carbonylation of methyl acetylene according to claim 1 wherein the temperature and pressure as selected are interrelated, the interrelation employed being substantially that represented by FIGURE 1 hereof.

3. The process of claim 1 in which the compound containing the hydrogen donor group is methanol.

4. The process of claim 1 in which the compound containing the hydrogen donor group is ethanol.

5. The process of claim 1 in which the compound containing the active hydrogen atom is methacrylic acid.

6. A continuous catalytic carbonylation process for manufacture of acrylic compounds which comprises the steps of continuously introducing methyl acetylene, carbon monoxide, a catalytic amount of 0.1% and over of nickel carbonyl, a compound containing a hydrogen donor group, and selected from the group consisting of methanol, ethanol and water, and an acidic compound containing an active hydrogen atom, into a reaction zone held at elevated temperatures of above 210° F. and pressures of above 95 p.s.i.g., up to a temperature of 380° F. and a pressure of 1200 p.s.i.g. and continuously removing carbonylated acrylic product therefrom.

7. The process of claim 6 in which the nickel carbonyl, methyl acetylene, compound containing the active hydrogen atom and the hydrogen donor compound are permitted to contact each other only in the presence of carbon monoxide.

8. The process of claim 6 in which the compound containing the active hydrogen atom is methacrylic acid.

9. The process of claim 6 in which the compound containing the hydrogen donor group is methanol.

10. The process of claim 6 in which the compound containing the hydrogen donor group is ethanol.

11. The process of claim 1 in which the compound containing the active hydrogen atom is an organic acid.

12. The process of claim 6 in which the compound containing the active hydrogen atom is an organic acid.

References Cited

UNITED STATES PATENTS

| | | | |
|---|---|---|---|
| 2,582,911 | 1/1952 | Neher et al. | 260—486 |
| 2,599,424 | 6/1952 | Albrecht et al. | 260—486 |
| 2,653,969 | 9/1953 | Albrecht et al. | 260—486 |
| 2,964,558 | 12/1960 | Leathers et al. | 260—486 |
| 2,990,403 | 6/1961 | Gehshan et al. | 260—486 XR |
| 3,009,948 | 11/1961 | Lautenschlager et al. | 260—486 |

FOREIGN PATENTS

| | | |
|---|---|---|
| 1,394,019 | 2/1965 | France. |

OTHER REFERENCES

Sakakibara, "Snythesis of Methacrylic Esters by Carboxylation Reaction of Methylacetylene," from the article presented at the 16th annual meeting of the Chemical Society of Japan, Tokyo, presented April 1963 and published in vol. 37, November 1964, pp. 1601–1609.

LORRAINE A. WEINBERGER, Primary Examiner

ALBERT P. HALLUIN, Assistant Examiner